UNITED STATES PATENT OFFICE.

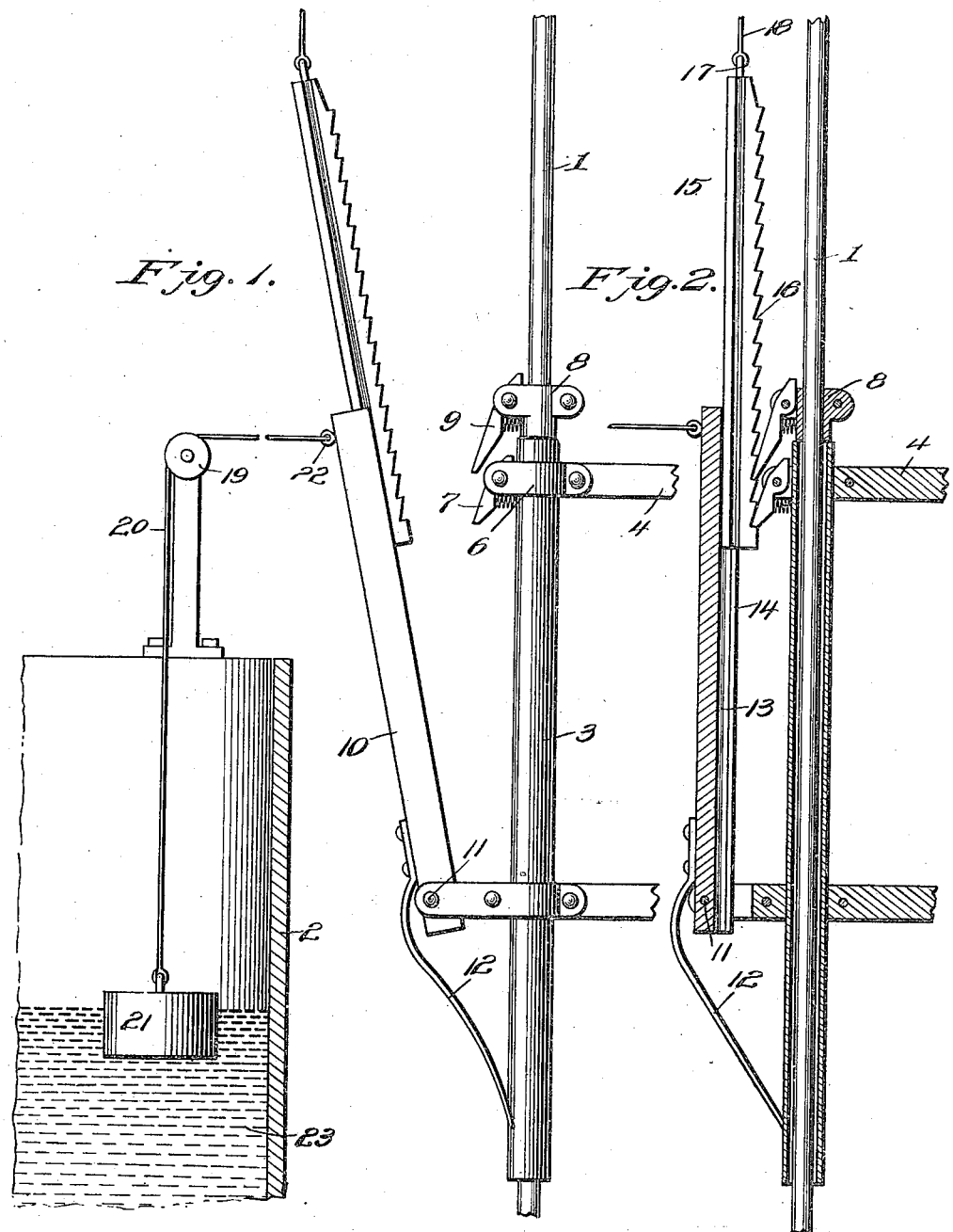

CHAMP T. ECHOLS, OF MULLIN, TEXAS.

WINDMILL-REGULATOR.

964,408.          Specification of Letters Patent.     Patented July 12, 1910.

Application filed November 3, 1909. Serial No. 526,147.

*To all whom it may concern:*

Be it known that I, CHAMP T. ECHOLS, a citizen of the United States, residing at Mullin, in the county of Mills and State of Texas, have invented new and useful Improvements in Windmill - Regulators, of which the following is a specification.

This invention relates to automatic regulators for wind mills, and the objects of the invention is to provide a device of this character which is of an extremely simple construction, which can be easily and quickly applied to any ordinary wind mill and which provides novel and effective means for drawing the wheel out of the wind when the water tank has been sufficiently filled to suspend the operation of the pump rod and which also provides means for swinging the wheel to the wind to operate the pump, as occasion may demand.

In the accompanying drawings there has been illustrated a simple and preferred embodiment of the improvement, and in which, Figure 1 is a side elevation of the device, the water tank being shown in section the wind wheel being in its operative position to allow the pump to fill the tank. Fig. 2 is a central longitudinal sectional view of the improvement.

In the accompanying drawings the numeral 1 designates the ordinary pump rod which is connected with a suitable pump not shown, and which is adapted to deliver water to a tank designated by the numeral 2.

The numeral 3 designates a sleeve mounted upon the reciprocating pump rod 1 and supported by a suitable frame 4. The frame 4 may be of any desired preferred construction and has its upper horizontal bar provided with a suitable collar member 6, the outer end of which is bifurcated to receive a spring pressed dog 7. The pump rod 1, which reciprocates within the sleeve 3, is also provided with a removable and adjustable collar 8, and the said collar 8 has outwardly extending ears between which is pivotally connected a spring pressed dog 9 of similar construction to the dog 7. The lower horizontal member of the frame 4 extends a suitable distance beyond the sleeve 3 and this extension is provided with a supporting bar 10 pivotally connected with this portion of the frame as designated by the numeral 11. Secured upon the outer face and adjacent the lower edge of the supporting bar 10 is a resilient element 12. The element 12, in the device illustrated in the figures of the drawing, comprises a flattened member having its lower free edge normally contacting with the sleeve 3 and adapted to exert pressure so as to force the supporting bar 10 to swing toward the sleeve 3. The supporting bar 10 has its inner face provided with a longitudinally extending slot or opening 13 and the vertical walls provided by the said opening are provided upon their outer faces with reduced tongues 14. The slot 13 and the tongues 14 are adapted to serve as a way for a sliding rack bar 15, which has its opposite faces channeled to engage the tongues 14 and the slot or recess 13. The rack bar 15 has its face, adjacent the pump rod 1 and the sleeve 3 suitably stepped as at 16, while the upper portion of the said bar is provided with a suitable bail or ring 17 adapted to engage the lower extremity of the wind wheel regulating wire 18.

By reference to Fig. 2 of the drawings, it will be noted that the resilient member 12 exerting a pressure so as to force the supporting bar 10 and the rack bar 15 carried thereby toward the sleeve 3 and the pump rod 1 forces the steps or teeth 16 of the sliding bar 15 into engagement with the dogs 7 and 9. By this arrangement it will be noted that the lower dog 7 acts as an effective stopper for preventing the upward movement of the bar 15 while the dog 9, being free to slide over the steps or teeth 16 engages the uppermost tooth when the pump rod 1 has been moved upward the length of its stroke and that upon the downward stroke of the said pump rod the bar 15 will be forced downwardly within the slotted supporting bar 10, thus causing the regulating wire 18 to be drawn downwardly and to swing or turn the wind wheel connected with the wire 18 out of the wind and thus prevent the reciprocation of the rod 1.

Pivotally connected upon the top of the tank 2 is a suitable pulley 19 over which is passed a flexible element 20. This element 20 has one of its ends connected with a float weight 21 and its opposite end connected with an eye 22 provided upon the rear face of the pivoted supporting bar 10. The float 21 is of a sufficient weight to overcome the tension of the spring element 12, and as the water 23 within the tank 2 decreases the said weight will cause the supporting bar 10 to swing away from the sleeve 3 upon its pivot 11 and thus disengage the dogs 7 and 9 from the teeth 16 of the sliding bar 15. When the rack bar is thus disengaged from the dogs 7 and 9, the mechanism connected with the wind wheel, which is of an ordinary construction and which it has not been deemed necessary to illustrate, will allow the said wind wheel to be swung into the wind and the pump rod is again reciprocated until the water 23 within the tank 2 rises a sufficient distance to slack the tension of the element 20 and to allow the resilient member 12 to again swing the supporting bar 10 toward the sleeve 3 and the pump rod 1 and force the teeth 16 of the sliding bar 15 again into engagement with the spring pressed dogs 7 and 9. When this is accomplished the pump rod will rise the full length of its stroke and upon its descent will through the medium of the dog 9, force the rack bar downwardly within the hollow supporting bar 10 and again swing the wind wheel, through the medium of the regulating wire 18, out of the wind.

Having thus described the invention, what I claim as new is:—

In a device for the purpose set forth, a sleeve, a frame comprising spaced arms secured to the sleeve, a collar upon one of the arms provided with a spring pressed dog, a reciprocatory pump rod mounted within the sleeve, an adjustable collar upon the pump rod, a spring pressed dog carried by the collar, a supporting bar pivotally connected with the lower arm of the frame, said supporting bar being provided with a flattened spring having its free end contacting with the sleeve, the supporting bar being also provided with an opening extending the entire length of one of its faces, the said face being provided with oppositely arranged projecting tongues partly inclosing the opening, a sliding rack bar having its sides channeled and adapted to engage the opening and the tongues of the supporting bar, said rack bar being connected with the regulating wire of the wind mill, a tank, a pulley upon the tank, a weighted float within the tank, and a flexible member connected with the float and passing over the pulley and engaging the pivoted supporting bar, substantially as and for the purpose set forth.

In testimony whereof I affix my signature in presence of two witnesses.

CHAMP T. ECHOLS.

Witnesses:
  CHAS. GRAHAM,
  CARL WILSON.